United States Patent [19]
Chen et al.

[11] Patent Number: 5,861,450
[45] Date of Patent: *Jan. 19, 1999

[54] ORGANIC POLYMERS MODIFIED WITH THERMOPLASTIC SILICONE BLENDS

[75] Inventors: Wei Chen; Kevin Edward Lupton; David Joseph Romenesko; Randall Gene Schmidt; Hongxi Zhang, all of Midland, Mich.

[73] Assignee: Dow Corning Corporation, Midland, Mich.

[*] Notice: The term of this patent shall not extend beyond the expiration date of Pat. No. 5,844,031.

[21] Appl. No.: 705,105

[22] Filed: Aug. 28, 1996

[51] Int. Cl.[6] ....................................................... C08K 5/24
[52] U.S. Cl. ................ 524/269; 264/331.11; 264/331.21; 524/506; 524/586; 524/588; 525/105; 525/106
[58] Field of Search ...................................... 524/269, 588, 524/506, 586; 264/331.21, 331.11; 525/105, 106

[56] References Cited

U.S. PATENT DOCUMENTS

| | | | |
|---|---|---|---|
| 2,676,182 | 4/1954 | Daudt et al. | 260/448.2 |
| 4,935,484 | 6/1990 | Wolfgruber et al. | 528/34 |
| 5,324,806 | 6/1994 | Wengrovins et al. | 528/10 |
| 5,403,891 | 4/1995 | Romenesko | 525/106 |

*Primary Examiner*—Melvyn I. Marquis
*Attorney, Agent, or Firm*—Richard I. Gearhart

[57] ABSTRACT

An additive to improve the hydrophobicity of a thermoplastic resin wherein the additive is at least 0.3 parts by weight of a thermoplastic silicone blend, said thermoplastic silicone blend having:

(A) an organosilicone resin of the empirical formula

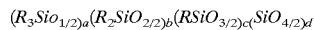

$(R_3SiO_{1/2})_a(R_2SiO_{2/2})_b(RSiO_{3/2})_c(SiO_{4/2})_d$ wherein: a and d are positive numerical values and b and c are zero or positive numerical values with the provisos that a+b+c+d=1, $0 \leq (b+c) \leq 0.2$ and the ratio of a:(b+c+d) is between about 0.3 and 1.0; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl; and (B) a predominantly linear silicone fluid having the empirical formula

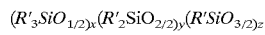

$(R'_3SiO_{1/2})_x(R'_2SiO_{2/2})_y(R'SiO_{3/2})_z$ wherein: x and y are positive numerical values and z is 0 or a positive numerical value with the provisos that x+y+z=1, $y/(x+y+z) \geq 0.8$; and R' is a monovalent radical independently selected from the group consisting of hydroxyl and alkyl radicals, which R' groups may be the same or different, with the proviso that at least sixty mole percent of said R' radicals are methyl;

said organosilicone resin (A) and said predominantly linear silicone fluid (B) being present in relative amounts such that said blends have a dynamic shear modulus (G*), measured at a frequency of 10 radians/sec, of at least 5×10$^7$ dyne/cm$^2$ at temperatures less than said predetermined maximum storage temperature.

18 Claims, No Drawings

ORGANIC POLYMERS MODIFIED WITH THERMOPLASTIC SILICONE BLENDS

FIELD OF THE INVENTION

The present invention relates to thermoplastic compositions. More particularly, the invention relates to compositions having improved properties wherein thermoplastic silicone pellets are added to a thermoplastic resin.

DESCRIPTION OF THE PRIOR ART

Description of the prior art and the present invention requires that the definition of certain terms be understood.

As used herein, the term "silicone fluid" describes a linear silicone polymer, for example polydimethylsiloxane. The term "fluid" is used in this sense even if the linear polymer contains a minor amount of branched chains or if, at room temperature, the material appears as more of a gum or solid. In other words, the term "fluid" describes only the predominantly linear characteristics of the polymer. It will be understood that silicone fluids may also include reactive or functional groups.

Silicone fluids, then, can be defined as being of the general formula:

$$(R'_3SiO_{1/2})_x(R'_2SiO_{2/2})_y(R'SiO_{3/2})_z$$

wherein x and y are positive numerical values and z is 0 or a positive numerical value with the provisos that $x+y+z=1$, $y/(x+y+z) \geq 0.8$ and R' is a functional or nonfunctional, substituted or unsubstituted organic radical.

As used herein, the term "resin" describes a silicone composition wherein the molecular structure is arranged in a predominantly three dimensional network. Thus, the term silicone "resin" is used to distinguish the composition from silicone fluids.

The silicone resins utilized in the present invention are frequently designated "MQ" resins. MQ resins are macromolecular polymers comprised primarily of $R_3SiO_{1/2}$ and $SiO_{4/2}$ units (the M and Q units, respectively) wherein R is a functional or nonfunctional, substituted or unsubstituted organic radical. Those skilled in the art will appreciate that such resins may also include a limited number of $R_2SiO_{2/2}$ and $RSiO_{3/2}$ units, respectively referred to as D and T units. As used herein, the term "MQ resin" means that, on average, no more than about 20 mole percent of the resin molecules are comprised of D and T units. Such resins are frequently produced by the method disclosed in U.S. Pat. No. 2,676,182, Daudt et al., which is incorporated herein by reference.

MQ silicone resins are generally produced in such a manner that the resin macromolecules are dissolved in a solvent, which is typically, but not always, an aromatic solvent. Thus, as used herein, the term "solventless" means that substantially all the liquid solvent has been removed from the "solid" resin phase.

It is known in the art to produce solventless forms of silicone resins.

In U.S. Pat. No. 4,935,484 to Wolfgruber et al., there is disclosed a method for obtaining silicone resin powders by spray-drying aqueous colloidal suspensions of organopolysiloxanes. The process utilizes resins prepared from alkoxysilanes, or the partial hydrolyzate thereof and an emulsifier. The hydrolytically-formed alkanol is distilled off and the resultant suspension spray-dried. organopolysiloxanes, which are sustantially free of alkoxy groups and which have a maximum of eight siloxane units per molecule, may also be employed, provided that they are mixed with at least one alkoxy silane or a partial hydrolyzate thereof.

U.S. Pat. No. 5,324,806 to Wengrovius et al. discloses another method of making a solventless silicone resin which is described as a free-flowing powder. In the method of Wengrovius et al. an organosiloxane hydrolyzate is dispersed into an organic solvent and thereafter spray-dried.

The solventless powder form of resins produced by the teachings of Wolfgruber et al. and Wengrovius et al. has several drawbacks. Because the powders generally have low bulk density they are expensive to store and ship. Powders are also inconvenient to handle and convey in manufacturing processes. Finally, powders do not exhibit thermoplastic behavior and hence are difficult to disperse when formulating blends with other products, such as organic thermoplastics and silicone rubbers.

Finally, U.S. Pat. No. 5,403,891 to Romenesko teaches a lubricant useful for fabricating an extruded article made from polyethylene comprising 100–3,000 ppm of an organosilicone resinous copolymer and a silioxane polymer, wherein the silioxane polymer has alkyl, aryl, alkenyl and trifluoropropyl radical(s). The present invention is distinguishable, however, because the present invention utilizes larger quantities of the resin/siloxane to improve hydrophobicity, and the '891 patent does not teach the use of hydroxyl terminated siloxane fluids.

None of the aforereferenced prior art teaches the use of the thermoplastic silicone pellet added to a thermoplastic resin to achieve impoved properties, such as improved hydrophobicity.

SUMMARY OF THE INVENTION

It has now been found that, when a thermoplastic silicone blend is added to a thermoplastic resin, considerably improved properties are obtained.

The present invention therefore relates to a composition comprising:

(I) 100 parts by weight of a thermoplastic resin; and
(II) 0.3 to 10 parts by weight of a thermoplastic silicone blend having
  (A) an organosilicone resin of the empirical formula $$(R_3SiO_{1/2})_a(R_2SiO_{2/2})_b(RSiO_{3/2})_c(SiO_{4/2})_d$$

wherein: a and d are positive numerical values and b and c are zero or positive numerical values with the provisos that $a+b+c+d=1$, $0<(b+c)\leq 0.2$; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl; and
  (B) a predominantly linear silicone fluid having the empirical formula $$(R'_3SiO_{1/2})_x(R'_2SiO_{2/2})_y(R'SiO_{3/2})_z$$

wherein: x and y are positive numerical values and z is 0 or a positive numerical value with the provisos that $x+y+z=1$, $y/(x+y+z)\geq 0.8$; and R' is an independently a monovalent hydroxyl or alkyl radical, which R' groups may be the same or different, with the proviso that at least sixty mole percent of said R' radicals are methyl;
  said predominantly linear silicone fluid having a degree of polymerization greater than about 10;
  said organosilicone resin (A) and said predominantly linear silicone fluid (B) being present in relative amounts such that said pellets have a dynamic shear modulus (G*), measured at a frequency of 10 radians/sec, of at least $5 \times 10^7$ dyne/cm² at temperatures less than said predetermined maximum storage temperature.

In particularly preferred embodiments, a linear low density polyethylene is modified with thermoplastic silicone pellets. Such compositions exhibit surprisingly improved hydrophobicity.

DETAILED DESCRIPTION OF THE INVENTION

The thermoplastic resins that constitute the component (A) of the invention are preferably polyolefins, but can be other thermoplastic resins as well, such as nylons, polyesters, polystyrenes, polyurethanes and acrylic resins, among others. As used herein, the term "thermoplastic resin" is meant to refer to polymers which soften when exposed to heat and then return to original solid condition when cooled to room temperature. In the case where the thermoplastic resin is a polyolefin, it may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4-methylpentene-1, pentene-1, octene-1, nonene-1 and decene-1, inter alia. Interpolymers of two or more of the above mentioned olefins may also be employed as component (I) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

Component (I) may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Particularly preferred thermoplastic resins (I) are polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 200,000.

The above interpolymers are well known in the art and further description thereof is considered unnecessary.

Component (II) is a thermoplastic silicone blend. The thermoplastic silicone blend can be in the physical form of a flake, a powder or a pellet. The most preferred form of the thermoplastic silicone blend useful for the present invention is a pellet. As used herein, the term "pellet" means a particle having an effective diameter of at least 800 micrometers. Further, for purposes of the present invention, particles having an effective diameter less than about 800 micrometers are considered powders. Although pellets need not be spherical in shape, the aforementioned minimum effective diameter translates to a minimum volume of about $2.7 \times 10^{-4}$ cm³.

The thermoplastic silicone blends are made by blending an organosilicone resin (A) with a predominantly linear silicone fluid (B) to form a substantially homogeneous mixture thereof, then forming same into a flake, powder or pellet.

The organosilicone resin (A) has the empirical formula:

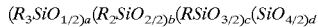

wherein: a and d are or positive numerical values and b and c are zero or positive numercial values with the provisos that a+b+c+d=1, 0≦(b+c)≦0.2 and the ratio of a:(b+c+d) is between about 0.3 and 1.0; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl. The organosilicone resin (A) has a number average molecular weight (Mn) between about 2,000 and about 15,000, with 3,000–7,000 being most preferred.

As previously mentioned, the organosilicone resins employed in the present invention are of the MQ-type and are generally prepared in a solution of an organic solvent. When Mn is less than about 2,000 the resins retain the characteristics of a liquid, regardless of whether or not they are removed from solution. When Mn is greater than about 7,000, the resins disperse poorly in silicone polymers. Likewise, when the ratio of a:(b+c+d) is less than about 0.3, Mn is generally greater than 7,000 and when the ratio is greater than about 1.0, Mn is generally less than about 2,000.

The predominantly linear silicone fluids (B) used in the present invention have the empirical formula

wherein: x and y are positive numerical values and z is 0 or a positive numerical value with the provisos that x+y+z=1, y/(x+y+z)≦0.8; and R' is a monovalent radical independently selected from the group consisting of hydroxyl or alkyl, which R' groups may be the same or different, with the proviso that at least sixty mole percent of said R' radicals are methyl. The above limitations with respect to x, y and z define the predominantly linear nature of the fluid (B).

The predominantly linear silicone fluid (B) has a degree of polymerization greater than about 10. At least sixty mole percent of said R radicals are methyl, although molar amounts of eighty to ninety percent are most preferred. Silicone fluids having a degree of polymerization less than about 10 are generally too volatile and tend to be lost during the heating step (II) of the method of the invention. More preferred are silicone fluids having a degree of polymerization of about 100 and more. Those skilled in the art will appreciate that degree of polymerization of the fluid (B) as well as the amount thereof in the resin (A)/fluid blend will influence the value of the dynamic shear modulus G* and complex viscosity η* of the blend at any given temperature.

Predominantly linear silicone fluids (B) are commercially available from most silicone suppliers. For instance Dow Corning® SGM 36 gum is a suitable type of predominantly linear silicone fluids (B) and is commercially available from the Dow Corning Corporation of Midland, Mich. Another suitable dimethylhydroxy-terminated fluid is Dow Corning Q3-5016, available form Dow Corning Corporation, Midland.

To produce the thermoplastic silicone pellets, the silicone resin (A) is blended with silicone fluid (B), preferably in an extruder. The blended compostion is thereafter extruded into thermoplastic silicone pellets. Methods of making the thermoplastic silicone blends used in the present invention are taught and more fully described in detail in currently co-pending patent application U.S. Pat. No. 5,356,585 issued Oct. 18, 1994. entitled METHOD OF PREPARING SOLVENTLESS THERMOPLASTIC SILICONE PELLETS AND THE PELLETS SO-PRODUCED, which pending application is incorporated herein by reference in its entirety for it's teaching. The production of flakes and powders are also known in the art.

In the invention, the organosilicon resin (A) and the predominantly linear silicone fluid (B) are present in relative amounts such that the blend thereof has a complex viscosity ($\eta^*$) of less than $10^8$ centipoise at the predetermined compression-forming temperature. The predetermined compression-forming temperature is typically in the range of about 125° C. to 225° C., although higher and lower temperatures are not excluded from the method of the invention. At the predetermined compression-forming temperature the resin (A)/fluid (B) blend must exhibit thermoplastic behavior, i.e. it must be flowable to the extent that the compression-forming produces a densified mass. While the complex viscosity is inversely proportional to temperature, the compression-forming step must be maintained at a temperature that is less than that which causes chemical degradation of the resin (A) or fluid (B). That temperature is about 400° C.

The flowable characteristic of the resin (A)/fluid (B) blend at the compression-forming temperature is just opposite the characteristic sought at the predetermined maximum storage temperature. If the pellets exhibit flowable characteristics at the predetermined maximum storage temperature, they tend to agglomerate. Accordingly, the relative amounts of the resin (A) and fluid (B) are balanced such that the dynamic modulus, $G^*$, of the blend, measured at a frequency of 10 radians/sec, is at least $5 \times 10^7$ dynes/cm$^2$ at temperatures below the predetermined storage temperature. The present inventors have found that when $G^*$ is in excess of the aforementioned, the pellets tend to resist agglomeration and retain their easy handling characteristics.

On the other hand, in the preferred embodiment of the invention the value of $G^*$ is maintained at a value less than about $10^9$ dynes/cm$^2$. When $G^*$ becomes too high, the silicone resin(A)/fluid (B) composition tends to become brittle and the pellets tend to break apart, thereby decreasing their ease of handling.

Thus, in the composition of the pellets of the invention, the relative amounts of resin (A) and fluid (B) are balanced so as to meet both criteria for the predetermined compression-forming temperature and the predetermined maximum storage temperature. Preferably, the organosilicone resin is from 23 to 50 parts by weight of the thermoplastic silicone blend, and the the predominantly linear silicone fluid is about 10 parts by weight of the thermoplastic silicone blend. A most preferred ratio is about 75 parts by weight resin and 23 parts fluid for the total resin/silicone matrix.

Also critical to the practice of the present invention is the type of extruder die used in the extrusion process. In order to practice the present invention it is preferable to extrude or inject the composition through a metal die. The most preferred die is stainless steel, although chromium, nickel and platinum dies can also be used. It is not required that the metal be solid chromium, nickel or platinum; the die may be plated. The use of a metal die is critical to obtaining the desired properties of the invention. The metal die attracts the hydroxyl groups of the polydiorganosiloxane, causing the polydiorganosiloxane to migrate toward the die. As a result the polydiorganosiloxane collects and concentrates at the surface of the film, giving the film improved hydrophobic properties.

The compositions of the present invention are prepared by thoroughly dispersing from about 0.3 to 50 parts by weight of thermoplastic silicone blend (B) in 100 parts by weight of a thermoplastic (A). The thermoplastic silicone blend will constitute a more susbstantial part (10 to 50 parts) if it is formulated into a masterbatch which is then used for further processing. For finished products, it is preferred that about 0.3 to about 5 parts by weight of component (B) is used for each 100 parts by weight of component (A). More preferably, about 0.5 to 4 parts of (B), and most preferably about 1 to 3 parts, per 100 parts by weight of (A) are used. When the thermoplastic silicone blend is added at levels below about 0.3 part per 100 parts by weight of (A), there is little improvement in the contact angle versus the corresponding unmodified polyolefin. Similarly, at levels higher than about 10 parts of (B) per 100 parts by weight of (A), the surface quality of the extrudate again begins to deteriorate, which makes the composition undesirable for finished products. Furthermore, when more than about 10 parts of (B) per 100 parts by weight of (A) is used, an excessive amount of siloxane is observed on the surface of the extrudate which adversely impacts such properties as printability and sealability. Additionally, the physical properties of the final extrudate are degraded.

The dispersion of thermoplastic silicone pellet (II) into thermoplastic resin (I) may be accomplished by any of the traditional means for mixing additives into thermoplastic resin at elevated temperature. For example, the two components may be blended in a twin-screw extruder, a Banbury mixer, a two-roll mill or a single-screw extruder, either with or without a mixing head. The equipment used to mix these component is thus not critical as long as a uniform dispersion of (II) in (I) is attained. Preferably the dispersed particle size is no larger than about 10 micrometers.

In addition to the above components, compositions of the present invention may also contain up to about 1 percent by weight of each of the following: fillers, cure agents, lubricants, u.v. stabilizers, antioxidants, antiblock agents, catalyst stabilizers and other process aids commonly employed in the modification of polyolefins. When more than about 1 weight percent of any of these additional ingredients is used, there is interference with the process aid of the present invention such that the above described benefits in processing and/or the character of the resulting extruded materials are not optimal. This is particularly critical in the case of blown film production, where good surface quality is crucial. Moreover, up to 15% by weight of the total composition of the present invention could be an antiblock agent.

Specific non-limiting examples of the above additional ingredients include the following substances. Diatomaceous earth, octadecyl-3-(3,5-di-5-butyl 4-hydroxyphenyl)-propionate, bis(2-hydroxyethyl) tallowamine, calcium stearate, N,N-bis(2,2,6,6-tetramethyl-4-piperidinyl)-1,6-hexanediamine polymer with 2,4,6-trichloro-1,3,5-trizaine and 2,4,6-trichloro-1,3,5-trizaine and 2,4,4-trimethyl 1,2-pentanamine, dimethyl succinate polymer with 2,2,6,6-tetramethyl-1-piperridineethanol, 2,2-thiobis)4-tert-octylphenolato]n-butylamine nickel, tris(2,4-di-tert-butylphenyl)phoshite, bis(2,4-di-t-butylphenyl)

pentaerythritol diphosphite, trisnonylphenylphospite, polyethylene glycol, Erucamide, titanium dioxide, titanium dioxide, alumina, hydrated alumina, talc, 2-hydroxy-4-n-octyloxy-benzophenone, silicone dioxide, zinc oxide, zinc sulfide and zinc stearate.

According to the method of the present invention, the above described thermoplastic silicone blend (II) is added to the thermoplastic resin (I) and serves as a process aid therefore when the resin is processed at elevated temperatures to form a shaped product (e.g., a cylindrical cross-section, such as a film, ribbon, bar, annulus, fiber, sheet, bottles, trays, jugs or the like). The resulting extrudate has an improved hydrophobicity relative to a similar extrudate which does not contain thermoplastic silicone blend (B). This method is particularly applicable to the production of cast film or blown film, but also finds utility in extrusion blow molding; injection molding; pipe, wire, or cable extrusion; fiber production; and any similar high shear melt processing of polyolefin resins, all of these techniques being well known in the art.

Briefly stated, blown film is typically produced by a "bubble" technique, wherein the polyolefin composition (i.e., the melt) is extruded through an annular die to form a film in the shape of a bubble. This bubble is withdrawn from the die at a rate greater than the rate of extrusion, while a positive air pressure is maintained within the bubble. Film produced in this manner is biaxially oriented as a result of stretching in the radial and axial directions and this orientation generally imparts improved mechanical properties to the film. Cast film is generally prepared by extruding the polyolefin through a slot die followed by cooling on one or more chill rolls. In the case where the composition is injection molded, the die must also be metal, or the mold into which the thermoplastic is injected is made of metal, such as stainless steel, or plated with chromium, nickel or platinum among others.

The extrudate of the present invention may also be formed into non-woven fibers using methods well known in the art.

The compositions of the present invention can therefore be further subject to a further process step which are well known in the art, such as but not limited to injection molding, injection blow molding, extrusion blow molding, blown film processes, cast film processes, profile extrusion, rotational molding, compression molding, transfer molding, thermoforming and calendering.

The modified thermoplastic resins of the present invention show a variety of improved properties. For example it is believed by the inventors that the siloxane migrates to the surface of the thermoplastic. The migration of the polysiloxane to the surface of the thermoplastic gives the surface of the thermoplastic improved properties, such as improved hydrophobicity and pourability. Thus, films and shaped articles such as bottles or other containers made from the invention have better hydrophobicity and/or pourability.

Moreover, the congregation of silicone at the surface of the thermoplastic gives the thermoplastic an improved "hand". This property is important where the thermoplastic is polypropylene and it is used to produce a non-woven fiber, where the sensory and tactile characteristics of the fibers are important. In addition, adding the polyorganosiloxane of the present invention also improves the process efficiency of the thermoplastic.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 25° C., unless indicated to the contrary.

CONTACT ANGLE—Measurements

The contact angle between a drop of specified liquid and a specified substrate is determined using a goniometer which measures the angle of the tangency of the drop profile to the surface. The material tested may be either the liquid or the substrate. In the following examples, distilled water was used and the substrates varied. The observed angle is reported in degrees along with the identity of both the liquid and substrate. This method is similar to ASTM D 724.

To make the measurements, the optical bench of the goniometer was leveled. The specified substrate was placed on the support stage and secured. The stage was adjusted so that the substrate or film could be clearly viewed through the microscope or video camera. A drop (2.5 mm in diameter) was placed on the substrate by making direct liquid to surface contact. The liquid was not dropped on the surface or otherwise distorted during placement. The illuminator was adjusted to optimum level and the microscope focused on the dark drop silhouette against a lighter background. The angle of tangency on both the left-hand and right-hand solid/liquid interface on the drop was measured and reported. The procedure was repeated three times and the average value reported to the nearest degree.

MATERIALS

The following materials were employed in the examples. LLDPE=a linear, low density polyethylene; an octene-based copolymer of ethylene having a density of 0.917 g/cc and marketed under the trade name DOWLEX™ 2045A by the Dow Chemical Co., Midland, Mich.

LDPE=a low density polyethylene having a density of 0.923 g/cc and marketed as DOW™ GP-LDPE 5004IM by the Dow Chemical Co.

HDPE=a high density polyethylene having a density of 0.923 g/cc and marketed as DMDH™ 6147 by Nova Chemical (Lemester, Mass.).

Nylon 6=Capron™ 8202 Allied Signal, (Mt. Morris, N.Y.).

THERMOPLASTIC SILICONE PELLETS

An MQ resin was blended with two different silicone fluids, in varying proportions. The silicone fluids used to produce the pellets were, for Pellet A, a polydimethylsiloxane having a viscosity of about 350 cSt, which has a DP of 135; and for Pellet B, a hydroxyl-terminated polydimethylsiloxane gum having a DP of about 9,000 to 10,000.

The blending was carried out in a xylene solution, after which the solvent was removed by heating at 120° C. under vacuum. The individual composition blend were then compression-formed by compression-molding to form pellets.

Compression-molding was carried out at a temperature of 150° C. under a pressure between 1.5 and 5.0 MPa for 5 minutes, followed by cold-pressing for two minutes. This resulted in compression-formed square slabs approximately 2 mm thick and 10 cm on a side, which were then shaped into pellets by cutting into squares approximately 2 mm–4 mm on a side.

Extrusion was carried out using Haake System-90 rheometer equipped with a TW100 twin-screw extruder. The extruder had intermeshing counter-rotating high intensity mixing screws, about 33 cm in length. Extrusion speed was determined by screw rotation, which was maintained at 100 rpm. The temperature in the extruder housing was maintained at 25° C. near the material feed port and between 100° C. and 140° C. adjacent the extrusion die. The extrusion die itself was maintained at 25° C. The extrudate (i.e. the compression-formed blend of resin (A) and fluid (B)) had a diameter of about 2 mm and was cooled in a water trough upon exiting the die. The cooled extrudate was then cut into pellets about 4 mm long with a reciprocating knife blade.

The dynamic shear modulus, G*, at 25° C. and the complex viscosity, $\eta^*$, at temperatures of 150° C. and 200° C. of the Example compositions were measured on a dynamic mechanical thermal analyzer, model no. RDA-2 having 25 mm parallel plates (available from Rheometrics, Inc. of Piscataway NJ.) and showed G* values of $2.99 \times 10^8$ for Pellet A and $8.78 \times 10^8$ for Pellet B. Frequency sweeps between 1 radian/second and 100 radians/sec were carried out at each temperature and at strains which insured linear viscoelastic behavior throughout. The values reported below correspond to a frequency of 10 radian per second.

The resin used in the preparation of the samples was 71.5 weight percent solids solution in xylene, the resin comprising about 75% of the resin/fluid matix. Nuclear magnetic resonance ($^{29}Si$) was used to determine the general formula and molecular weight. The general formula included: about 43 mole % M units of $(CH_3)SiO_{1/2}$; about 12 mole % T units of $(OH)SiO_{3/2}$; and about 45 mole % Q units of $SiO_{4/2}$. Resin-calibrated gel permeation chromatography (GPC) revealed that the number average molecular weight, Mn, generally ranged between about 4,600 and 5,000 and the weight average molecular weight, Mw, ranged between 17,000 and 22,000.

It should be noted that each of the above compositions exhibited sufficient thermoplastic behavior to permit them to be compression-formed to a densified mass at a low enough compression-forming temperature that degradation of the composition was avoided.

Example 2

Thermoplastic silicone pellets A made by the procedure of Example 1 were dispersed in differing amounts of thermoplastic resin. The amounts of pellets used were calculated so as to give a total silicone concentration of about 1%, 2.5%, and 5% by weight for each thermoplastic resin.

The mixtures were compounded by thoroughly mixing the thermoplastic silicone pellets and the polyethylene at elevated temperature, on a Haake Rheocord™ system 90 twin-screw extruder (Haake - Paramus, New Jersey), equipped with a Leistritz Micro 18 corotating twin screw extruder having a L/D (Lenth/Diameter) of 40/1 with the screw diameter of 18mm. Temperatures of the eight zones of each chamber of the extruder were set at 170° C for Zone 1, and 185° C. for Zones 2–8. In each case, the masterbatch composition was extruded through a strand die and chopped into pellets upon cooling in a water bath. The polyethylene was a 50/50 blend of LLDPE and LDPE.

After compounding in the twin screw extruder, the pellets were placed in a Blown Film Extruder (from Davis Standard) model KL-075 3/4 inch floor model extruder, L/D 24/1 having 3 heating zones at 220° C. A circular 2.5 inch diameter Stainless Steel die maintained at 220° C. was used to create the bubble. The air pressure inside the bubble was set so the blow up ratio was 2 thus creating a 5 inch "lay flat" tube of film. The air ring used room air to blow around the bubble to cool and crystallize the film. The collapsing gate and pinch roll system allowed the film to be collected. Samples were taken to measure the contact angle.

The following Table 1 shows that the selected silicones improved the contact angle of the substrate, indicating a higher level of hydrophobicity than the standard control for unmodified polyethylene.

TABLE 1

| Sample | Percent Silicone in Polyethylene | Water Contact Angle, degrees |
| --- | --- | --- |
| Virgin PE |  | 100 |
| Pellet A | 1% | 112 |
| Pellet A | 2.5% | 116 |
| Pellet A | 5% | 116 |

In each of the above amounts, an improvement in hydrophobicity was observed.

Example 3

The thermoplastic silicone resin pellets B made by the procedure of Example 1 were compounded in HDPE and Nylon then injection molded into panels and tested for hydrophobicity. The following procedures were used.

The mixtures were compounded by thoroughly mixing the thermoplastic silicone pellets and the HDPE or Nylon, at elevated temperature, on a Haake Rheocord™ system 90 twin-screw extruder (Haake—Paramus, N.J.), equipped with a Leistritz Micro 18 corotating twin screw extruder having a L/D (Lenth/Diameter) of 40/1 with the screw diameter of 18 mm. Temperatures of the four zones of each chamber of the extruder were set according to the thermoplastic resin, as set forth in Table 2 below.

TABLE 2

|  | HDPE | Nylon 6 |
| --- | --- | --- |
| Zone 1 | 230° C. | 250° C. |
| Zone 2 | 255° C. | 260° C. |
| Zone 3 | 255° C. | 260° C. |
| Zones 4–8 | 260° C. | 260° C. |

In each case, sufficient thermoplastic silicone pellets were added so that the total concentration of the silicone was about 10% by weight of the total composition weight. These "masterbatch" compositions were extruded through a strand die and chopped into pellets upon cooling in a water bath.

The masterbatch pellets made according to the procedure above were then recompounded on the Haake Rheocord™ system 90 twin-screw extruder, this time adding sufficient thermoplastic resin to make compositions having 0.5%, 1.0% and 2.5% by weight of silicone. This procedure was repeated for each of the thermoplastic resins, HDPE and Nylon. This resulted in pellets having 0.5%, 1.0% and 2.5% by weight of silicone for each thermoplastic resin, HDPE and Nylon. These compositions were then used to injection mold the panels ultimately tested for hydrophobicity.

The 4×4×⅛ inch panels refered to below were produced in an Arburg 35 ton clamp rating injection molding machine having a general purpose single screw having a 15/1 L/D with a screw diameter of 30 mm and a screw compression ration of 2/1. There are 3 heating zones, a heated nozzle (tip size=2 mm) and a heated mold cavity to make the 4×4×⅛ inch panels. The temperatures change relative to the plastic material being molded, the temperature of each zone being noted below.

TABLE 3

|  | HDPE | Nylon 6 |
|---|---|---|
| Zone 1 | 230° C. | 250° C. |
| Zone 2 | 255° C. | 260° C. |
| Zone 3 | 255° C. | 260° C. |
| Nozzle Temp | 260° C. | 255° C. |
| Mold Temp | 150° C. | 170° C. |

The pellets were added to the injection molding machine and injected into 4x4xl/8 inch panels for each particular weight percent silicone and each thermoplastic. Ten panels were made for each thermoplastic and each weight percent silicone and the water contact angle measured on each.

The average water contact angle and standard deviation of the ten panels are shown in Tables 4 and 5 below.

TABLE 4

HDPE DMDH 6147
Water Contact Angles

|  | 0% HDPE | 0.5% | 1.0% | 2.5% |
|---|---|---|---|---|
| Average | 111.0 | 117.7 | 116.9 | 119.8 |
| STD | 0.9 | 1.8 | 2.9 | 2.0 |
| Variance | 0.9 | 3.1 | 8.5 | 4.0 |

TABLE 5

Nylon 6 Allied Signal 8202 NL
Panels
Water Contact Angles

|  | 100% Nylon | 0.5% | 1.0% | 2.5% |
|---|---|---|---|---|
| Average | 67.3 | 77.1 | 72.8 | 79.4 |
| STD | 1.5 | 4.6 | 2.8 | 2.0 |
| Variance | 2.2 | 21.2 | 7.7 | 4.0 |

In the case of high density polyethylene (see Table 4) the panel showed from 6–7% improvement in hydrophobicity over the film tested without the additive. In the case of the nylon panels, (Table 5) the addition of the additive showed an average improvement in hydrophobicity of from 8% to 15% depending on the amount of Pellet B added.

That which is claimed is:

1. A composition comprising:

(1) 100 parts by weight of a thermoplastic resin; and (II) at least 0.3 parts by weight of a thermoplastic silicone blend, said thermoplastic silicone blend having:

(A) an organosilicone resin of the empirical formula $$(R_3SiO_{1/2})_a(R_2SiO_{2/2})_b(RSiO_{3/2})_c(SiO_{4/2})_d$$

wherein: a and d are positive numerical values and b and c are zero or positive numerical values with the provisos that a+b+c+d=1, 0£(b+c)£0.2 and the ratio of a:(b+c+d) is between about 0.3 and 1.0; and R is a monovalent radical independently selected from the group consisting of hydrogen, hydroxyl, alkyl, alkenyl, alkoxy, oximo, aryl, epoxide, carboxyl, ether, polyether, amide and alkyl amino radicals, which R groups may be the same or different, with the proviso that at least sixty mole percent of said R radicals are methyl; and (B) a predominantly linear silicone fluid having the empirical formula $$(R'_3SiO_{1/2})_x(R'_2SiO_{2/2})_y(R'SiO_{3/2})_z$$

wherein: x and y are positive numerical values and z is 0 or a positive numerical value with the provisos that x+y+z=1, y(x+y+z)³ 0.8; and R' is a monovalent radical independently selected from the group consisting of hydroxyl and alkyl radicals, which R' groups may be the same or different, with the proviso that at least sixty mole percent of said R' radicals are methyl;

said predominantly linear silicone fluid having a degree of polymerization greater than about 10;

said organosilicone resin (A) and said predominantly linear silicone fluid (B) being present in relative amounts such that said blends have a dynamic shear modulus (G*), measured at a frequency of 10 radians/sec, of at least $5 \times 10^7$ dyne/cm² at temperatures less than said predetermined maximum storage temperature.

2. The composition according to claim 1, wherein said thermoplastic resin (I) is a polyolefin selected from the group consisting of low density polyethylene, linear low density polyethylene, polypropylene, and high density polyethylene, and blends of the forgoing polyolefins.

3. The composition according to claim 1, wherein said thermoplastic resin (I) is selected from the group consisting of polyesters, polyamines, polyamides and acrylic resins.

4. The composition according to claim 1, wherein the organosilicone resin is from 23 to 50 parts by weight of the thermoplastic silicone blend, and the the predominantly linear silicone fluid is about 10 parts by weight of the thermoplastic silicone blend.

5. The composition according to claim 1, wherein the predominantly linear silicone fluid (B) is a gum.

6. The composition according to claim 1, wherein the predetermined maximum storage temperature is between about 0° C. and 50° C.

7. The composition according to claim 1, wherein the thermplastic silicone blend is a pellet.

8. The composition according to claim 1, wherein the thermoplastic silicone blend (II) is 0.5 to 15 parts by weight of thermoplastic resin (I).

9. The composition according to claim 1, wherein the thermoplastic silicone blend (II) is 0.5 to 5 parts by weight of thermoplastic resin (I).

10. The composition according to claim 1, wherein at least 0.01 mole percent of R' are hydroxyl.

11. The composition according to claim 1, wherein at least eighty to ninety mole percent of R' are methyl.

12. In a method of processing a thermoplastic resin in which a process aid is added to the thermoplastic resin to facilitate processing thereof, the improvement comprising adding as the process aid a thermoplastic silicone blend and processing the resin through a metal die, whereby the resulting thermoplastic resin exhibits an improved degree of hydrophobicity relative to the unmodified thermoplastic resin, wherein said thermoplastic silicone blend having:

(A) an organosilicone resin of the empirical formula $$(R_3SiO_{1/2})_a(R_2SiO_{2/2})_b(RSiO_{3/2})_c(SiO_{4/2})_d$$

wherein: a and d are positive numerical values and b and c are zero or positive numerical values with the provisos that a+b+c+d=1, 0 £(b+c)£0.2 and the ratio of a:(b+c+d) is between about 0.3 and 1.0; and R is a monovalent radical independently selected from the group consisting of hydrogen, hydroxyl, alkyl alkenyl, alkoxy, Qximo, aryl, epoxide, carboxyl, ether, polyether, amide and alkyl amino radicals, which R groups may be the same or different, with the proviso that at least sixty mole percent of said R radicals are methyl;

said organosilicone resin (A) having a number average molecular weight (Mn) between about 2,000 and about 7,000; and (B) a predominantly linear silicone fluid having the empirical formula

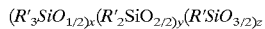

wherein: x and y are positive numerical values and z is 0 or a positive numerical value with the provisos that $x+y+z=1$, $y/(x+y+z)^3$ 0.8; and R' is a monovalent radical independently selected from the group consisting of hydroxyl and alkyl radicals, which R' groups may be the same or different, with the proviso that at least sixty mole percent of said R' radicals are methyl;

said predominantly linear silicone fluid having a degree of polymerization greater than about 10, said organosilicone resin (A) and said predominantly linear silicone fluid (B) being present in relative amounts such that said blends have a dynamic shear modulus (G*), measured at a frequency of 10 radians/sec, of at least $5 \times 10^7$ dyne/cm$^2$ at temperatures less than said predetermined maximum storage temperature.

13. The method according to claim 12, wherein said thermoplastic resin is a polyolefin.

14. The method according to claim 12, wherein the resulting processed thermoplastic resin is subjected to a film blowing step.

15. The method according to claim 12, wherein the resulting processed thermoplastic resin is subjected to a cast film step.

16. The method according to claim 12, wherein the resulting processed thermoplastic resin is injection molded.

17. Shaped products of the composition according to claim 1.

18. Shaped products of the method according to claim 12.

* * * * *